Jan. 2, 1962 TOSHIO KASHIO 3,015,445

RELAY TYPE BI-QUINARY ADDER APPARATUS

Filed May 20, 1958 2 Sheets-Sheet 1

Jan. 2, 1962 TOSHIO KASHIO 3,015,445

RELAY TYPE BI-QUINARY ADDER APPARATUS

Filed May 20, 1958 2 Sheets-Sheet 2

United States Patent Office 3,015,445

Patented Jan. 2, 1962

3,015,445

RELAY TYPE BI-QUINARY ADDER APPARATUS

Toshio Kashio, Musashino, Japan, assignor of one-half to Uchida Yoko Company, Limited, Tokyo, Japan, a corporation of Japan Filed May 20, 1958, Ser. No. 736,542

1 Claim. (Cl. 235—174)

This invention relates, in general, to a digital computer of relay type and more particularly to an adder circuit for use in such a computer.

In known digital computer with relay circuits, the basic arithmetic process of addition has been performed either by utilizing electrical pulses representing the numerals or by effecting a sequential operation. If two multi-digit numerals are added together in such a computer several steps are necessary to perform the addition of two digits in each digital position, the addition of each of the sums thus obtained and the digit 1 or 0 "carried-in" from the immediately preceding position and the like until the entire process of addition will be completed. In effect, no pair of digits can be added until carry information has been obtained from the addition of the preceding pair. A period of time is required to pass several pulses through the computer and to effect the sequential operation. This results in a period of time required to obtain the sum of two multi-digit numerals depending upon a number of digital positions which the numeral has. Accordingly, the computer of the type described above has a relatively low speed at which the addition process is performed.

A general object of the invention is to provide an improved adder circuit for performing the addition process at an extremely high speed independently of a number of digital positions.

It is well known that the use of the biquinary system of notation for representing decimal numbers has many advantages in performing the arithmetic calculation. According to the biquinary system the digits 0 to 9 can be represented by a set of ten different combinations of five code elements designated 0 to 4 and two additional code elements 00 and 5 which are used respectively when the digit is below five or above four. If desired, the "zero" elements may be omitted. This reduces the number of the code elements required. This simplified representation of the biquinary code is widely used in computers since it produces quite simple circuit for performing addition.

One object of the invention is to provide an improved biquinary adder network for a digital position of decimal number in which two digits in that position are added together and to the "carry-in" digit with the "carry-out" digit produced simultaneously.

Another object of the invention is to provide a simplified adder circuit whereby all digits are added simultaneously and all output or summation and "carry-out" digits appear at the same time.

A further object of the invention is to provide an improved adder circuit arrangement for performing the sequential addition of numerals.

According to the invention, there is provided an adder network for a digital position of decimal number comprising a pair of inputs, a pair of outputs, a quinary network section for handling the digits 0, 1, 2, 3 and 4, and a binary network section operative when the digits to be handled are 5 or more and connected in series with the quinary network section through a pair of internal carry leads, one of said pair of inputs being operative when the carry-in digit will be present or be unity in the section, the other of said pair of inputs being operative when the carry-in digit will be absent or be zero in the section, one of each of said pairs of outputs and internal carry leads being operative when the carry-out digit will appear in its associated section, the other of each of said pair of outputs and internal carry leads being operative when no carry-out digit will appear in its associated section; said quinary network section comprising a first network portion including five summation members responsive to the summation digits 0, 1, 2, 3 and 4 respectively and a first contact network connected to said pair of inputs consisting of a plurality of addend contacts responsive to the addend digits 1, 2, 3 and 4 and of a plurality of summand contacts responsive to the summand digits 0, 1, 2, 3 and 4 for disjunctively connecting said one or the other of inputs to said summation responsive members through the operated and/or inoperated contact or contacts in said first contact network, dependent upon the resulting quinary summation digit obtained from the addition of the summand and addend digits and the carry-in digit 1 or 0, and a second network portion connected to said pair of internal carry leads consisting of a plurality of summand contacts responsive to the summand digits 0, 1, 2, 3 and 4 and of addend contacts responsive to the addend digit 4 for disjunctively connecting said pair of internal carry leads to that summation responsive member corresponding to said resulting summation digit through the operated and/or unoperated contact or contacts in said second network portion in accordance with the presence or the absence of the carry-out digit in the quinary section; said binary network section comprising a third network portion including at least two summation members responsive to the decimal summation digits below five and above 4 or the binary summation digits 0 and 1 respectively and a second contact network connected to said pair of internal carry leads consisting of a plurality of addend contacts responsive to the binary addend digit 1 and of a plurality of summand contacts responsive to the binary summand digits 0 and 1 for disjunctively connecting said one or the other of internal carry leads to said last-mentioned summation responsive members through the operated and/or unoperated contact or contacts in said second contact network, dependent upon the resulting binary summation digit appearing in the binary section, and a fourth network portion connected to said pair of outputs consisting of a plurality of summand contacts responsive to the binary summand digits 0 and 1 and of addend contacts responsive to the binary addend digit 1 for disjunctively connecting said pair of outputs to that summation responsive member corresponding to said resulting binary summation digit through the operated and/or unoperated contact or contacts in said fourth network portion in accordance with the presence or the absence of the carry-out digit in the binary section whereby two decimal digits are together and to the carry-in digit and simultaneously the carry-out digit appears.

The summation responsive members corresponding to the digit 0 may comprise resistor members while the remaining summation members may comprise summation relay winding members.

According to one preferred embodiment of the invention, said first contact network may consist of a pair of addend transfer chains connected to said pair of inputs each including four addend transfer contacts responsive to the addend digits 1, 2, 3 and 4 respectively and of five contact groups each including five normally open summand relay contacts responsive to the summand digits 0, 1, 2, 3 and 4 respectively and associated with different ones of said summation responsive members, the transfer contacts for the addend digits 1, 2, 3 and 4 in one of said transfer chains connected to said one of inputs being respectively coupled to the transfer contacts for the addend digits 2, 3, 4 and 1 in the other of said transfer chains connected to said the other of inputs and to different ones of said contact groups; said second network portion may consist of a summand transfer chain including four summand transfer contacts responsive to the summand digits 0, 1, 2 and 3 respectively and adapted to be coupled to the summation responsive members for the digits 0–3 and to said one of internal carry leads, a summand transfer contact responsive to the summation digit 4 and adapted to be coupled to the summation responsive member for the digit 4 and to said the other of internal carry leads, and an addend transfer contact responsive to the addend digit 4 coupled to said pair of internal carry leads. The binary network section may comprise a second contact network consisting of a pair of transfer trees having a pair of inputs connected to said pair of internal carry leads respectively and three outputs connected respectively to a pair of summation resistor members responsive to the binary summation digit 0 and a summation relay winding member responsive to the binary summation digit 1, each of said transfer trees including a pair of summand transfer contacts responsive to the decimal summand digit above 4 or the binary summand digit 1 and an addend transfer contact responsive to the binary digit 1, one of said summand transfer contacts being common in said pair of the transfer trees, the pair of said summation resistor members being connected to said pair of outputs respectively, said second contact network being adapted to disjunctively connect said one or the other of internal carry leads to said summation responsive members through the operated and/or unoperated contact or contacts in said second contact network, dependent upon the resulting binary summation digit obtained from the addition of the binary summand and addend digits and the carry-in digit 1 or 0 and simultaneously to selecting either of said summation resister member in accordance with the presence or the absence of the carry-out digit in the binary section when the summation digit will be zero, said summation relay winding member being arranged to be connected to said one of outputs through a summand relay transfer contact as operated and an addend transfer contact as operated and to be connected to said the other of outputs either through said summand relay transfer contact as unoperated or through said summand relay transfer contact as operated and said addend transfer contact as unoperated, said last-mentioned transfer contacts being responsive to the binary digit 1.

It will be seen that the embodiment described above uses six summand relays 0X, 1X, 2X, 3X, 4X and 5X responsive to the summand digits 0, 1, 2, 3, 4 and 5 respectively, five addend registering devices 1Y, 2Y, 3Y, 4Y and 5Y arranged to control respectively the addend transfer contacts 1*y*, 2*y*, 3*y*, 4*y* and 5*y* corresponding to the addend digits 1, 2, 3, 4 and 5 respectively, and five summation relays 1Z, 2Z, 3Z, 4Z and 5Z responsive to the summation digits 1, 2, 3, 4 and 5 respectively. The sole operative member corresponding to the digit 0 is the summand relay 0X. This results in the production of a quite simple circuit for performing addition.

The operative relationship between the relays and contacts mentioned above and the digits to be handled are illustrated in the following table.

*Table 1*

| Decimal Digit | Summand Relay | Sum Relay | Addend Contact |
|---|---|---|---|
| 0 | 0X | none | none. |
| 1 | 1X | 1Z | 1y. |
| 2 | 2X | 2Z | 2y. |
| 3 | 3X | 3Z | 3y. |
| 4 | 4X | 4Z | 4y. |
| 5 | 5X and 0X | 5Z | 5y. |
| 6 | 5X and 1X | 5Z and 1Z | 5y and 1y. |
| 7 | 5X and 2X | 5Z and 2Z | 5y and 2y. |
| 8 | 5X and 3X | 5Z and 3Z | 5y and 3y. |
| 9 | 5X and 4X | 5Z and 4Z | 5y and 4y. |

According to one feature of the invention, one adder network described previously (which is referred to, hereinafter as a Z operating network) may be disposed in each of digital positions of decimal number and the networks connected in series with each other through a pair of carry leads whereby the summation relays in the respective positions are operated instantaneously and selectively. In this case, the adder network in the lowermost position may be dispensed with one of its input operative when the carry-in digit will be present while the network in the uppermost position has a pair of its outputs connected together. With this arrangement, a period of time required to obtain a sum of two numerals does not depend upon a number of digital positions and is substantially equal to a relay operating period which may be of the order of from 5 to 10 milliseconds.

In known digital computers operable mechanically or electrically, the addition of an addend Y to a summand X causes a number Z equal to the sum of the numbers X and Y to appear on a summand unit which has initially indicated the number X and the sequential addition can be performed. However, a period of time is required to perform this addition of two numbers and the number X cannot be instantaneously translated into the number Z. As pointed out above, the addition of two numerals according to the invention leads to the appearance of the summation digits indicated by the operated summation relays and the sequential addition cannot be performed directly.

The invention also contemplates to perform the sequential addition. For this purpose, the Z operating network in a digital position may operatively be coupled with means for causing the summand relay or relays to respond to the summation digit in that position and releasing the operated summation relay or relays thereby to make the same ready for the next operation. Accordingly, the summation digit in the position can be indicated by the responding or operated summand relay or relays in that position. This permits to indcate the summation digits by means of electric lamps or other suitable indicators adapted to be energized through the contacts on the operated summand relays 0X—5X.

For a digital position, said means for effecting the response of the summand relay may comprise a network for holding the summation relay or relays, a network for operating the summand relay or relays and a network for holding the same. As in the Z operating network, each of those networks may consist of a quinary section and a binary section connected in series with the same.

The network for holding the summation relay or relays is referred to, hereinafter, as a Z holding network and serves to hold the summation or Z relay or relays operated by said Z operating network in their operated state. The Z holding networks in the respective digital positions are preferably connected in series with each other. For the purpose of mere self-holding, those networks may not necessarily be connected in series with each other. With the series arrangement, a fault such as disconnecting of contacts in the Z holding network in any digital position will prevent a current from passing through the networks in all of the positions. Therefore, a control relay may be connected in circuit with this series arrangement for stopping the calculating operation thereby to prevent any mis-calculation.

The network for operating the summand relay or relays is referred to, hereinafter, as an X operating network and adapted to operate the summand relay or relays corresponding to the operated summation relay or relays. If no summation relay will be operated, the summand relay 0X will be operated by a current flow through serially connected break contacts each provided on different one of the summation relays. The X operating networks in the respective positions may preferably be connected in series with each other for the reason as described in the preceding paragraph.

The network for holding the summand relay or relays is referred to, hereinafter, as an X holding circuit and serves to hold the summand relay or relays operated through the X operating network in their operated state.

According to another feature of the invention, there may be provided an adder circuit comprising an arrangement of serially connected X operating networks connected in parallel to an arrangement of serially connected Z holding networks, said parallel arrangement being connected across a suitable source of direct current through a normally opened contact on a double throw switch, and an arrangement of serially connected Z operating networks with a normally opened switch connected in parallel to an arrangement of serially connected X holding networks, the latter parallel arrangements being connected across said source of direct current through a normally closed contact on said double throw switch.

The invention will now be apparent from the following detailed description in conjunction with the accompanying drawings illustrating one embodiment thereof by way of example and in which.

Figure 1:
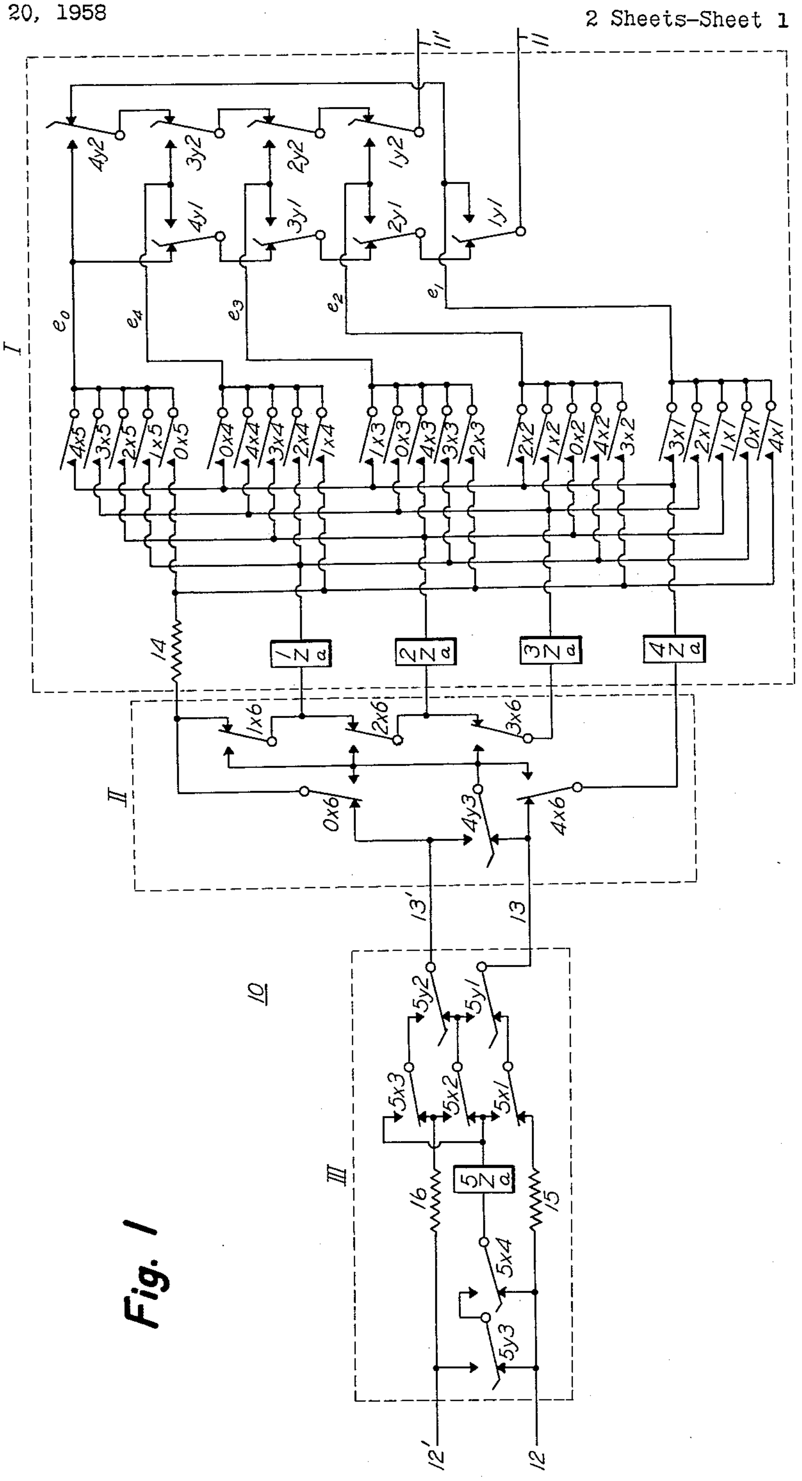
FIG. 1 shows a schematic diagram of a network for selectively operating a summation relay or relays in accordance with the summation digit obtained from the addition of the summand addend digit and the carry-in digit 1 or 0 in a digital position.

In order to aid in understanding the principle of the invention, consider as an example the addition of two two-digit numerals: 78 and 35. In any computer, that addition may be performed by adding first the numeral 78 to the numeral 0 and then adding the numeral 35 to the resulting sum. In a manual mechanical computer, for example, a set of summation dials may initially indicate the numeral 0 and the numeral 78 may be registered by a registering mechanism. One complete revolution of an operating handle on the computer then may cause an answer to the addition of the numerals 0 and 78, that is, a numeral 78 to appear on the set of summation dials. Thereafter, the numeral 35 may be registered by the registering mechanism and a further complete revolution of the handle may cause a sum of the addition of the numerals 78 and 35, that is, a numeral 113 to appear on the set of summation dials. The process of the addition according to the invention should also be performed in the manner described just above.

Figure 5:
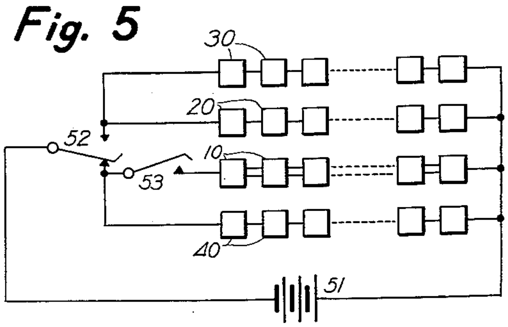
FIG. 5 shows a connecting diagram illustrating how the networks shown in FIGS. 1 to 3 are connected.

Referring now to FIG. 5, there is shown a wiring diagram of one arrangement capable of effecting the addition process according to the teaching of the invention. A row circuit comprising a plurality of serially connected X-operating networks 30, each assigned to different one of digital positions of decimal numeral is connected in parallel to a row circuit comprising a plurality of serially connected Z holding networks 20, each provided in different one of the digital positions, and both the row circuits are connected across a suitable source of direct current 51 through a make or normally open contact on a switch 52. A row circuit comprising a plurality of serially connected Z operating networks 10 and a normally open switch 53 connected serially to the same is connected in parallel to a plurality of serially connected X holding networks 40. Different one of each of the networks 30 and 40 is assigned to each digital position. The latter parallel arrangement of the row circuits is connected across the source of direct current 51 through a brake or normally closed contact on the switch 52.

Figure 4:
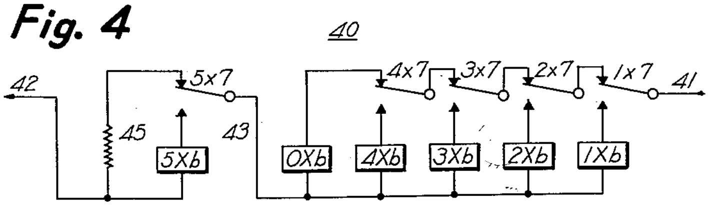
FIG. 4 shows a schematic diagram of a network for holding the summand relay or relays.

As seen in FIG. 5, a current from the source 51 will normally flow through the row circuit comprising the X holding networks 40. One form of the X holding network for a digital position is illustrated in FIG. 4. This network comprises a quinary network section corresponding to the qui-part of a digit in the position and a binary network section corresponding to the bi-part of the same. The quinary network section includes X holding windings 0X*b*, 1X*b*, 2X*b*, 3X*b* and 4X*b* respectively of summand relays 0X, 1X, 2X, 3X and 4X (not shown) which, in turn, are responsive to the summand digits 0, 1, 2, 3 and 4 in the position respectively; and transfer contacts 1*x*7, 2*x*7, 3*x*7 and 4*x*7 forming a transfer chain. The transfer contact 1*x*7 has its movable element connected to an input lead 41 adapted to be connected to output of the similar network in the immediately preceding position and the transfer contact 4*x*7 has its break half connected to one end of the winding 0X*b*. Each of the windings 1X*b*—4X*b* has its one end connected to said one end of winding 0X*b* and has the other end connected to different one of the break halves of the transfer contacts 1*x*7—4*x*7. It will be seen that the lead 41 can disjunctively be connected to the windings 1X*b*—4X*b* through the make half of the transfer.

The holding windings 0X*b*—4X*b* are connected through an internal lead 43 to the binary section of the X holding network 40 comprising a transfer contact 5*x*7 the make half of which is connected to an X holding winding 5X*b* of a summand relay 5X (not shown) responsive to the summand digit above 4 and the break half of which is connected to a resistor 45 having one end connected to that end of the winding 5X*b* remote away from the transfer contact 5*x*7. The junction of the resistor 45 and the winding 5X*b* is adapted to be connected by means of a lead 42 to input of an X-holding network in the next position, that is a transfer contact 1*x*7 thereof.

The transfer contacts 1*x*7—5*x*7 are adapted to be controlled by the corresponding summand relays 1X—5X respectively. Preferably, the holding winding 0X*b*—5X*b* should have the same resistance value for direct current and the resistor 45 should have said resistance value.

Since each of the X-holding networks 40 in the respective digital positions is initially in a state shown in FIG. 4, a current will be passed from the source of direct current 51 through the break halves of the transfer contacts 1*x*7, 2*x*7, 3*x*7, 4*x*7, the holding winding 0X*b*, the break half of the transfer contact 5*x*7 and the resistor 45 in each of the digital positions back to the source 51 thereby to energize the windings 0X*b*. The energization of the windings 0X*b* in the respective positions indicates a summand value of zero (0).

Here again two decimal numerals 78 and 35 are added together. As pointed out previously, the invention preferably utilizes the biquinary system of notation. The addition of biquinary numbers is essentially the same as decimal numbers. The two two-part digits in each position are added together and to the carry-in digit, to give the summation digit and the carry-out digit. However, the two qui-part of digits and the two bi-part digits in a position must be added independently, making the use of internal carry signals. In order to add the numeral 78 to the numeral 0 indicated as described above, the former numeral must be registered by operating a set of register keys. The registration of the numeral 78 will be accomplished by operating register keys 5Y and 2Y (not shown) corresponding respectively to the digits 5 and 2 in the tens position and operating register keys 5Y and 3Y (not shown) corresponding respectively to the digits 5 and 3 in the units position. After the numeral 78 has thus been registered the switch 53 is closed to energize the row circuit comprising a plurality of serially connected Z operating networks 10. The Z operating network 10 in a digital position is illustrated in FIG. 1 and will be hereinafter explained in great detail. Here it will be sufficient to describe that a current flow through the network 10 causes one or two summation relays in the position to be energized in accordance with the summation digit resulting from the addition of two digits in that position. This energization of the summation relays is simultaneously performed in the respective positions. In the instant case, the summand 0 and the addend 78 will make a sum 78. Therefore, the summation relays corresponding respectively to the digits 5 and 2 in the tens positions and the summation relays corresponding respectively to the digits 5 and 3 in the units position may be operated simultaneously.

In order that the summation digits thus obtained will be indicated by the summand relays corresponding to the operated summation relays in the respective positions and then that the latter relays will be released to be ready for the next operation, the switch 52 may be turned over to the opposite side or the upper side as viewed in FIG. 5 with the switch 53 closed. Here it is to be noted that the switch 52 has the property of closing the make contact before opening the break contact. Namely, it is of "continuity-transfer" type. Therefore, this turning-over of the switch 52 results in the closing of the X operating and Z holding circuits to energize the same and then in the opening of the Z operating and X holding circuits to de-energize the same.

Figure 3:
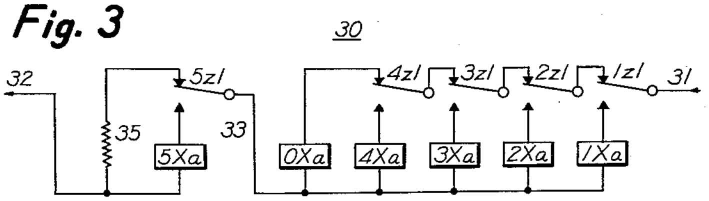
FIG. 3 shows a schematic diagram of a network for selectively operating a summand relay or relays for the position to cause the same to respond to a summation digit in that position.

Referring now to FIG. 3, there is shown one form of the X operating network 30 for a digital position comprising a quinary network section corresponding to the qui-part of a digit and a binary network section corresponding to the bipart thereof. The quinary section of the network 30 includes windings 0X*a*—4X*a* respectively of the summand relays 0X—4X and a transfer chain comprising transfer contacts 1*z*1—4*z*1 adapted to be controlled respectively by summation relays 1Z—4Z (not shown) corresponding to the summation digits 1, 2, 3 and 4 respectively. It will be seen that the windings and contacts are disposed in the same manner as in the network 40 shown in FIG. 4. The binary section of the network 30 similar in construction to that in the network 40 includes a winding 5X*a* of the summand relay 5X, a resistor 35 and a transfer contact 5*z*1 adapted to be controlled by the summation relay 5Z (not shown) corresponding to the summation above 4. The transfer contact 5*z*1 having its make half connected to the winding 5X*a* is connected through an internal lead 33 to the junction of the windings 0X*a*—4X*a* in the quinary section. The transfer contact 1*z*1 serves as an input adapted to be connected through a lead 31 to a output of a similar network in the immediately preceding digital position, and the junction of the resistor 35 and the winding 5X*a*, that is the output of the network 40 is adapted to be connected through a lead 32 to input of a similar network in the next position. Preferably, the respective windings 0X*a*—5X*a* and the resistor 35 are of the same resistance value for direct current.

Figure 2:
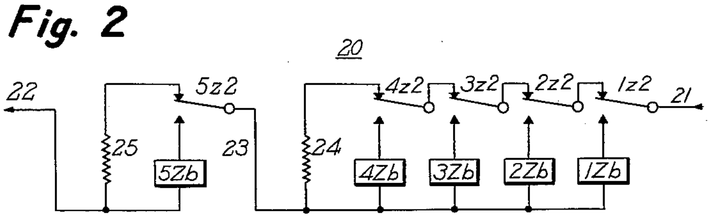
FIG. 2 shows a schematic diagram of a network for holding the summation relay or relays for the position.

The Z holding network 20 for a digital position may be constructed in the form as shown in FIG. 2. As seen in FIG. 2 the network 20 is substantially similar to the network 40 shown in FIG. 4 except that a resistor 24 is employed in place of the holding winding OX*b*. The resistor 24, holding windings 1Z*b*—4Z*b* respectively of the summation relays 1Z—4Z and transfer contacts 1*z*2—4*z*2 constituting a transfer chain are connected to each other in the similar manner as in the quinary section of the network 40 shown in FIG. 4. The transfer contacts 1*z*2—4*z*2 are controlled by the summation relays 1Z—4Z respectively, and the transfer contact 1*z*2 is adapted to be connected through a lead 21 to input of a Z holding network in the immediately preceding position. The junction of the resistor 24 and the windings 1Z*b*—4Z*b* is connected through an internal lead 23 to a transfer contact 5*z*2 in the binary section of the network 20 which, in turn, comprises the transfer contact 5*z*2, a Z holding winding 5Z*b* and a resistor 25 connected serially. The contact 5*z*2 is controlled by the summation relay 5Z and the junction of the winding 5Z*b* and the resistor 25 is adapted to be connected through a lead 22 to input of a Z holding network in the next position. Preferably, resistors 24, 25 and the windings 1Z*b*—5Z*b* have the same resistance for direct current.

When, as described previously, the summation relays 5Z and 2Z in the tens position and the summation relays 5Z and 3Z in the units position have been operated, the transfer contacts 5*z*1, 5*z*2, 2*z*1 and 2*z*2 in the tens position are operated whereby the windings 5X*a*, 5Z*b*, 2X*a* and 2Z*b* in that position are ready for the energization. Also, the transfer contacts 5*z*1, 5*z*2, 3*z*1 and 3*z*2 in the units position are operated whereby the windings 5X*a*, 5Z*b*, 3X*a* and 3Z*b* in that position are ready for the energization.

Since the switch 52 is operated in a make-before-break sequence, the transfer contacts on the previously operated summation relays are maintained in operated state for a short period after the turning-over of the switch 52. Accordingly, a current will be passed from the source 51 through the summation windings 5Z*b*, 2Z*b* in the tens position and the summation windings 5Z*b*, 3Z*b* in the units position to energize the same to hold the previously operated corresponding summation relays in operated state. Simultaneously, a current will pass from the source 51 through the make half of the operated contact 3*z*1, the summand winding 3X*a*, the make half of the operated contact 5*z*1, the summand relay 5X*a* in the units position and thence through the make half of the operated contact 2*z*1, the summand winding 2X*a*, the make half of the operated contact 5*z*1, the summand winding 5X*a* back to the source 51. Thereby the windings 5X*a*, 2X*a* in the tens position and the windings 5X*a*, 3X*a* in the units position are energized to close the make halves of the transfer contacts on the respective summand relays energized. Thereafter, the X operating and Z holding networks in the respective positions will be deenergized to be returned back to their original states shown in FIGS. 3 and 4.

The switches 52 and 53 may now be returned back to their original states. Since the switch 52 can first close its opened contact and then open its closed contact in the return stroke, this operation of the switch 52 will cause the holding windings on the operated summand relays to be energized from the source 51 by virtue of the previously operated contacts on those relays thereby to effect self-holding of the same. At the same time the opening of the switch 53 and the deenergizing of the Z holding networks 20 will release the summation relays which, in turn, will be ready for the next operation. Thus the resulting numeral 78 may be indicated by the operated summand relays. This means that the numeral is indicated as a summand. Therefore, it will be seen that the procedure described above can give an answer to the addition of two numeral 0 and 78.

In order to add the numeral 35 to the summand 78 thus obtained, the former must be registered by operating the register keys. This can be accomplished by operating the register key 3Y (not shown) corresponding to the digit 3 in the tens position and the register key 5Y (not shown) corresponding to the digit 5 in the units position. After this registration has been completed, the switch 53 may be closed to energize the Z operating networks 10 in the respective digital positions. Here it is remembered that the network 10 in the position serves to selectively operate the summation relay or relays in that position according to the summation digit resulting from the addition of two digit in that position. In addition, this network 10 serves simultaneously to add to said summation digit the carry-in digit and to produce the carry-out digit as described later in detail. Therefore, the addition of two numerals can instantaneously be performed. In the instant case, the current flow through the networks 10 can energize the summand relay 1Z in the hundreds position, the summation relay 1Z in the tens position and the summation relay 3Z in the units position in accordance with a sum 113. By turning over the switch 52 to the opposite side with the switch 53 closed, a current will flow through the Z holding and the X operating networks 20 and 30 thereby to hold the operated summation relays in operated state and to operate the summand relays corresponding to said operated summation relays as described previously. In this case, the summand relay 1Z in the hundreds position, the summand relay 1Z in the tens position and the summand relay 3Z in the units position will be operated.

The switches 52 and 53 then may be returned back to their original states to effect self-holding of the summand relays thus operated. Thus one process of adding the numerals 78 and 35 may be completed and the resulting numeral 113 obtained. From the foregoing it will be apparent that a period of time required to complete the addition of two numerals is substantially equal to the sum of a relay operating period during which the summation digits are obtained in the Z operating networks and a relay operating period during which said summation digits are indicated by the selectively operated summand relays, as summand digits. Since the relay operating period may be of the order of about 5 to 10 milliseconds as mentioned previously, the invention permits to complete the operation of adding two numerals within a period of from about 10 to 20 milliseconds irrespective of a number of digital positions.

Referring now in detail to FIG. 1, there is shown one form of a Z operating network for a digital position of decimal numbers in which two digits in that position are added together and to the carry-in digit and simultaneously the carry-out digit is produced according to the teaching of the invention. One Z operating network generally designated by the reference numeral 10 is provided for each of digital positions and connected through a pair of carry-in leads 11 and 11′ to the similar network 10 in the immediately preceding position. It will be seen that the carry-in leads 11 and 11′ from the immediately preceding position as inputs for the position are connected in similar arrangement to carry-out leads 12 and 12′ respectively and the carry-out leads 12 and 12′ are outputs for joining to the next position. If the carry-in digit from the immediately preceding position will be absent the carry-in lead 11 is adapted to be energized from the source of direct current 51 through the closed switch 53 (FIG. 5). If the carry-in digit will be present the carry-in lead 11′ is adapted to be similarly energized. The carry-out lead 12 is adapted to be similarly energized in the absence of the carry-out digit to be passed to the next position whereas the carry-out lead 12′ will be similarly energized in the presence of the carry-out digit. Also, it will readily be understood that the network 10 in the lowermost, for example, units position is dispensed with the carry-in lead 11′ and comprises only the carry-in lead 11 coupled directly to the source 51. However, the network 10 in the uppermost position comprises a pair of the carry-out leads connected together to the source 51 through the switch 53.

As in the network 20, 30 or 40 described previously, the Z operating network 10 comprises a quinary network section for handling a qui-part of a digit or any of digits 0, 1, 2, 3 and 4, and a binary network section for handling a bi-part of a digit or operative when any of digits 5, 6, 7, 8 and 9 is handled. Therefore, if a digit greater than four is to be handled both the network sections are in operation. A pair of internal carry leads 13 and 13′ connects the quinary section as viewed on the right hand side of those leads in FIG. 1 with the binary section as viewed on the left hand side thereof. As in the case of the carry-in and carry-out leads described above, the internal carry lead 13 or 13′ is adapted to be energized in the absence or the presence of the carry-out digit from the quinary network section.

As mentioned previously, the Z operating network 10 is operative to add two digits in a digital position together and further to the carry-in digit 1 or 0 with the carry-out digit simultaneously produced. Furthermore, the networks 10 in the respective positions are simultaneously operated thereby to selectively operate summation relays in those positions in such a way that the selectively operated summation relays will correspond to the resulting numeral obtained by the addition of a summand and an addend. For example, if the digit 7 is desired to be added to the digit 4 in a position a summation relay corresponding to the digit 1 in that position should be operated. If the carry-in digit will be present in this case a summation relay to be directly operated should be one corresponding to the digit 2 but not to the digit 1. However, such a process of addition in each of the digital positions is necessary to involve an operation for determining whether or not the carry-in digit will be present and whether or not the carry-out digit will be produced, simultaneously with an operation for determining a summation digit or summand +addend+carry-in digit 1 or 0. Such determinations is preferably made by serially connected networks but not by parallel-connected networks. In other words, the presence or the absence of the carry-in digit in a position must be predetermined prior to the completion of the operation of a carry-in relay in the immediately preceding position effected following or simultaneously with the determination of a summation digit in the latter position. Similarly, without spending a period of time required to operate a carry-out relay in the position concerned, it must be determined whether or not the carry-out digit will be produced.

The Z operating network shown in FIG. 1 comprises a first network portion enclosed with dotted rectangle I and provided in the quinary section for selectively operating any one of summation relays 1X—4X dependent upon a correct summation digit resulting from the addition of a summand digit, an addend digit and a carry-in digit 1 or 0; a second-network portion enclosed with dotted rectangle II and also provided in the quinary section for selecting either of the internal carry leads in accordance with the presence or the absence of the decimal digit 5 or the binary digit 1 carried forward to be added with the digits in the binary section; a third network portion in the binary section enclosed with dotted rectangle III for operating a summation relay 5Z when the resulting binary summation digit including the carry-in digit from the second network portion II will be 1 and for selecting either of the carry-out leads in accordance with the presence or the absence of the carry-out digit 1 when the resulting binary digit will be 0; and a fourth network portion in the binary section III for selecting either of the carry-out leads in accordance with the presence or the absence of the carry-out digit 1 when the resulting binary digit will be 1, said four network portions being connected in series to each other. Furthermore, the Z operating networks in the respective positions are connected in series with each other as described previously. The arrangement described just above permits to determine instantaneously and simultaneously all the resulting summation digits in the respective positions.

As shown in FIG. 1, the first network portion I for selectively operating the summation relay in the quinary section includes a transfer chain connected to the carry-in lead 11 and comprising four transfer contacts 1*y*1, 2*y*1, 3*y*1 and 4*y*1 for addends, and another transfer chain connected to the carry-in lead 11′ and comprising four transfer contacts 1*y*2, 2*y*2, 3*y*2 and 4*y*2, the make halves of the transfer contacts 2*y*1 and 1*y*2, of the contacts 3*y*1 and 2*y*2, and of the contacts 4*y*1 and 3*y*2 being joined together respectively. The transfer contact 1*y*1 has its make half joined to the break half of the transfer contact 4*y*2. The prefix numeral designating any one of the transfer contacts means that the transfer contact represented by that numeral is adapted to be controlled by a register key (not shown) corresponding to that numeral. For example, if the numeral or digit 3 will be handled the transfer contacts 3y1 and 3y2 on the register key 3Y will be operated or have the make halves closed.

The junction of the make half of the transfer contact 1y1 and the break half of the transfer contact 4y2 is connected through a conductor $e_1$ to a contact group consisting of five normally open contacts 0x1, 1x1, 2x1, 3x1 and 4x1, the junction of the make halves of the transfer contacts 2y1 and 1y2 connected through a conductor $e_2$ to a contact group consisting of five normally open contacts 0x2, 1x2, 2x2, 3x2 and 4x2, and the junction of the make halves of the transfer contacts 3y1 and 2y2 is connected through a conductor $e_3$ to a contact group consisting of five normally open contacts 0x3, 1x3, 2x3 and 4x3. Similarly the junction of the make halves of the transfer contacts 4y1 and 3y2 is connected through a conductor $e_4$ to a contact group consisting of five normally open contacts 0x4, 1x4, 2x4, 3x4 and 4x4 and the make half of the transfer contact 4y2 connected through a conductor $e_5$ to a contact group consisting of five normally open contacts 0x5, 1x5, 2x5, 3x5 and 4x5. It will be seen that the carry-in lead 11 is normally connected through the break halves of the transfer contacts 1y1—1y4 to the conductor $e_0$ and hence to the contact group 0x5—4x5, and can disjunctively be connected through the make half of the transfer to the conductors $e_1$—$e_4$ and hence to the remaining contact groups. The carry-in lead 11' is normally connected through the break halves of the transfer contacts 1y2—4y2 to the conductor $e_1$ and hence to the contact group 0x1—4x1, and can disjunctively be connected through the make half of the transfer to the conductors $e_0$, $e_2$, $e_3$, $e_4$ and hence to the remaining contact groups. As in the transfer contacts for addends, the prefix numeral designating any one of the above-mentioned contacts means that the contact represented by that numeral is adapted to be closed upon operating a summand relay corresponding to that numeral or digit. For example, if a summand digit will be 2 the contacts represented by the prefix numeral 2 will be closed upon operating the summand relay 2X (not shown) corresponding to the digit 2. Also, it will be apparent that each of the summation windings 1Za—4Za respectively of the summation relay 1Z—4Z (not shown) and a resistor 14 is coupled to the five normally open contacts each associated with different ones of the summand relays 0X—4X (not shown) corresponding to the digits 0 to 4 respectively. Preferably, the resistor 14 and the windings 1Za—4Za are of the same resistance for direct current. The resistor 14 corresponds to the summation digit 0 and the windings 1Za, 2Za, 3Za and 4Za correspond to the summation digits 1, 2, 3 and 4 respectively.

The second network portion II or the network portion for selecting the internal carry leads comprises a contact network composed of transfer contacts 0x6, 1x6, 2x6, 3x6 and 4x6 on the respective summand relays 0X—4X, and of a transfer contact 4y3 for addend corresponding to the digit 4, and serves to disjunctively connect any one of both the resistor 14 and the windings 1Za—4Za to either of the internal carry leads 13' and 13 in accordance with the presence or the absence of the carry-out digit produced by the first network portion.

The transfer contacts 0x6—3x6 form a transfer chain. The internal carry lead 13' is normally connected to the resistor 14 through the break half of the transfer contact 0x6, to the winding 1Za through the break halves of the transfer contacts 0x6, 1x6, to the winding 2Za through the break halves of the transfer contacts 0x6, 1x6, 2x6 and to the winding 3Za through the break halves of the transfer contacts 0x—3x6. The internal carry lead 13 is normally connected to the winding 4Za through the break half of the transfer contact 4x6. The make halves of the contacts 0x—4x6 are jointed together and arranged to be connected to the internal carry leads 13 and 13' through the make and break halves of the transfer contact 4y3 respectively. Therefore, it will be seen that the leads 13' can disjunctively be connected to the resistor 14 and the windings 1Za—4Za through the make half of the transfer contact 4y3 and the make half of the transfer chain while the lead 13 can disjunctively be connected to the resistor 14 and windings 1Za—4Za through the break half of the contact 4y3 and the make half of the transfer. Further, the resistor 14 can be connected to the lead 13' through the make halves of the transfer contacts 0x6 and 4y3, and the lead 13 connected to the winding 4Za through the break half of the contact 4y3 and the make half of the contact 4x6.

The binary network section III consisting of the third and fourth network portions comprises a contact network consisting of a pair of transfer trees having a pair of inputs connected to a pair of the internal carry leads 13 and 13' respectively and three outputs connected to a pair of summation resistors 15 and 16' and a summation winding 5Za. One of the transfer trees includes an addend transfer contact 5y1 and a pair of summand transfer contacts 5x1 and 5x2 and the other of the transfer trees includes an addend transfer contact 5y2 and a pair of summand transfer contacts 5x2 and 5x3 with the summand contact 5x2 common in both of the transfer trees. The transfer tree 5y1, 5x1, 5x2 is connected to the internal carry lead 13 and has its output connected to the summation resistor 15 which, in turn, is connected to the carry-out lead 12. The transfer tree 5y2, 5x2, 5x3 is connected to the internal carry lead 13' and has its output connected to the summation resistor 16 which, in turn, is connected to the carry-out lead 12'. The common output of both the transfer trees is connected to the summation winding 5Za adapted to be connected to the carry-out lead 13 either through a break half of a summand transfer contact 5x4 or through the make half of the contact 5x4 and a break half of an addend transfer contact 5y3 and to be connected to the carry-out lead 13' through the make halves of the summand and addend transfer contacts 5x4 and 5y3.

The transfer contacts 5y1—5y3 are adapted to be controlled by a register key 5Z (not shown) responsive to the decimal addend digit above four, while, the transfer contacts 5x1—5x4 adapted to be controlled by a summand relay responsive to the decimal summand digit above four. The resistors 15 and 16 are responsive to the binary 0 while the winding 5Za is responsive to the binary 1. Preferably, the resistors and the winding are of the same resistance for direct current. It will be seen that the internal carry leads 13 and 13' can disjunctively be connected to one or the other of the carry-out leads 12 and 12' through any one of several current paths.

Since the lowemost digital position, for example, the units position has no carry-in digit the carry-in lead 11' is eliminated as mentioned above and consequently the transfer chain consisting of the transfer contact 1y2—4y2 may be dispensed with. On the other hand, the carry-out leads 12 and 12' for the uppermost position are joined together.

The detailed operation of the Z operating network 10 described may best be understood from the following description about the foundation on which it has been constructed.

In the quinary section of the Z operating network in the units position, the addition of two digits each being 4 or less is performed but no carry-in digit appears. Therefore, the following postulates will be satisfied.

Postulate 1—If the addend digit is 0 the summand digits 0, 1, 2, 3 and 4 make the summation digits 0, 1, 2, 3 and 4 respectively;

Postulate 2—If the addend digit is 1 the summation digits 0, 1, 2, 3 and 4 make the summation digits 1, 2, 3 and 0 respectively;

Postulate 3—If the addend digit is 2 the summand digits 0, 1, 2, 3 and 4 make the summation digits 2, 3, 4, 0 and 1 respectively;

Postulate 4—If the addend digit is 3 the summand digits 0, 1, 2, 3 and 4 make the summation digits 3, 4, 0, 1 and 2 respectively;

Postulate 5—If the addend digit is 4 the summand digits 0, 1, 2, 3 and 4 make the summation digits 4, 0, 1, 2 and 3 respectively.

It should be noted that, even though the sum of two numbers would be equal to or more than 5 the summation digit is always 4 or less according to the above postulates. For example, if the summand digit 3 will be added with the addend digit 4 the summation digit 2 will be obtained according to postulate 5. However, the summation digit obtained actually has to be 7. Since the number 7 is equal to the sum of two numbers 2 and 5 the summation relay corresponding to the digit 2 is caused to be selected while the decimal number 5 or the binary number 1 must be carried to the binary network section in the units position. In this case, since it is not required to take into account of this carrying-out of the digit the addition of the numbers 3 and 4 may cause the summation digit to be 2.

By tracing the wiring diagram of the quinary network section shown in FIG. 1 with the transfer chain 1$y$2—4$y$2 removed, it will be apparent that the contact network consisting of the transfer contacts 1$y$—4$y$1 for addends and the normally open contacts 0$x$—4$x$ on the summand relays 0$x$—4$x$ corresponding respectively to the digits 0, 1, 2, 3 and 4 can satisfy the postulates described above. In FIG. 1 it is noted that the resistor 14 is used instead of a summation winding similar to each of the summation windings shown and corresponds to the digit 0. However, a summation relay winding may be employed in place of the resistor 14. As described previously, the resistor 14 has the same resistance for direct current as that of each of the summation windings 1$Za$—4$Za$ for rendering a current flow through that resistor equal to a current flow through any one of those windings.

With the arrangement described, each of the summation windings 1$Za$—4$Za$ and the resistor 14 is coupled to one operated contact on that summation relay operated in accordance with a summand digit as described in conjunction with FIG. 5. When the transfer contact 1$y$1, 2$y$1, 3$y$1 or 4$y$1 corresponding to a desired addend digit is then operated it will be seen that the carry-in lead 11 can be connected through the make half of the operated addend transfer contact and the operated summation contact to that summation winding corresponding to the summation digit resulting from the addition of the summand and addend digits. For example, if the summand digit will be 1, the summand contacts 1$x$1, 1$x$2, 1$x$3, 1$x$4 and 1$x$5 will be closed. With the addend digit 2, the transfer contact 2$y$1 will be operated to connect the carry-in lead 11 to the summation winding 3$Za$ through the conductor $e_2$ and the closed summand contact 1$x$2 resulting in the appearance of the summation digit 3. If the summation digit 0 will be obtained the resistor 14 may be connected through the closed summand contact and the make half of the operated transfer contact for the addend to the carry-in lead 11.

In any digital position other than the units position, the digit 1 may be carried-in from the immediately preceding position. This carrying-in of the digit is effected by means of the carry-in lead 11' as will be described hereinafter in detail. With the carry-in digit present, the summand digit may be added to the addend digit plus unity. In other words, an information transmitted from the immediately preceding position through the carry-in lead 11' and one operated transfer contact for an addend digit may be equivalent to an information transmitted from that position through the carry-in lead 11 and a transfer contact corresponding to the addend plus unity. For example, the addend digit 3 with the carry-in digit may be in the same condition as will addend digit 4 without the carry-in digit. For this purpose, each of transfer contacts for the addend digits other than the largest one coupled to the carry-in lead 11' should be associated with different one of the transfer contacts coupled to the carry-in lead 11 and corresponding to that addend digits plus unity with the make halves of both contacts connected together, and the transfer contact for the largest digit coupled to the former lead associated with the transfer contact for the smallest digit coupled to the latter lead with the break half of the former contact connected to the make half of the latter contact. Since the decimal number 5 is equivalent to the binary number 10, it will be appreciated that an information corresponding to the addend digit 4 with the carry-in digit can be passed to the conductor $e_0$ as does an information corresponding to the addend digit 0 without the carry-in digit. Thus the quinary network portion I comprising the contact network described above can effect the addition of two digits each being 4 or less irrespective of whether or not the carry-in digit will be present.

Since, in the network portion I, the addition of two digits, each being 4 or less with the carry-in digit 1 or 0 may produce a summation digit equal to or more than the decimal digit 5 it must be determined whether or not the carry-out digit will be carried forward to be added with the digits in the binary network section associated with that network portion I. This determination can be performed by means of the selecting network portion II shown in FIG. 1 and comprising the summand transfer contacts 0$x$6 through 4$x$6 and the addend transfer contact 4$y$3.

The addition of any one of the summands 0 to 4 and and any one of the addends 0 to 4 with the carry-in digit 1 or 0 may produce the summation digit 0 in the cases illustrated in the following table.

*Table 2*

| Case | Summand | Addend | Carry-in Digit |
|---|---|---|---|
| 1 | 0 | 0 | No. |
| 2 | 1 | 4 | No. |
| 3 | 2 | 3 | No. |
| 4 | 3 | 2 | No. |
| 5 | 4 | 1 | No. |
| 6 | 1 | 3 | Yes. |
| 7 | 2 | 2 | Yes. |
| 8 | 3 | 1 | Yes. |
| 9 | 4 | 0 | Yes. |

The addition of the summand 0 and the addend 0 without the carry-in digit, that is the case 1 shown in the above table produces the summation digit 0 alone. In the remaining cases, however, the summation digit obtained actually has to be the decimal number 5 which, in turn, is required to be carried forward to be added with the digits in the next binary network section. As seen in FIG. 1, the resistor 14 may be connected through one of the closed summand contacts and the operated and/or unoperated transfer contact or contacts for the addends to either of the carry-in leads 11 and 11' and to be energized from the source 51 by closing the switch 53 (see FIG. 5). If the resistor 14 will be energized and only if a current flowing through the same will be passed from the network 10 in the preceding position through the carry-in lead 11 when both the summand and addend digits will be 0, then that current should be passed to the internal carry lead 13. It can be said that, with both said digits being 0, the current flow through the resistor 14 should be passed to the internal carry lead 13, since the current flow through the carry-in lead 11′ in this case has to be passed to the summation winding 1Za but not to the resistor 14. In all of the remaining cases shown in Table 2, the current flow through the resistor 14 is necessary to be passed to the internal carry lead 13′.

From Table 2 it will be seen that, with the resistor 14 energized, (1) The carrying-out is effected for the summand digits other than 0;
(2) the carrying-out effected for the summand digit 0 with addend digit 4; and
(3) no carrying-out is effected for the summand digit 0 with the addend digit other than 4.

These rules lead to the following orders:

(I) The current flow through the resistor 14 shall be passed to the internal carry lead 13′ if the summand contacts 0x will not have been operated;
(II) the current flow through the resistor 14 shall be passed to the internal carry lead 13′ if the summand contacts 0x will have been operated with the addend contacts 4y operated; and
(III) the current flow through the resistor 14 shall be passed to the internal carry lead 13 if the summand contacts 0x will have been operated with the addend contacts 4y unoperated.

From FIG. 1 it will be understood that the selecting network portion II comprising the transfer contacts 0x6—4x6 for the summands and the transfer contact 4y3 for the addend can obey the three orders described above. As clear in FIG. 1, the resistor 14 is connected through the brake half of the transfer contact 0x6 to the internal carry lead 13′. With the contact 0x6 operated, the resistor 14 may be connected to the internal carry lead 13 through the addend contact 4y3 as unoperated while connected to the lead 13′ through the contact 4y3 as operated.

The next problem to be solved is to determine which of the internal carry leads 13 and 13′ should be energized with a current flowing through any one of the summation windings 1Za—4Za.

By analysing separately the individual cases in the manner as described in conjunction with the energized resistor 14, it has been found that whether or not the carrying-out is effected can be determined by the following rules:

(4) the carrying-out is effected for any of the summand digits greater than the resulting summation digit;
(5) the carrying-out is not effected for any of the summand digits less than the resulting summation digit; and
(6) with any of the summand digits equal to the resulting summation digit, the carrying-out is effected only for the addend digit 4, whereas the carrying-out is not effected for the addend digits other than 4.

Those rules 4–6 are held in the presence of the carry-in digit as well as in the absence of the same and may be replaced by the two following rules:

(7) the carrying-out is effected for any of the summand digits greater than the resulting summation digit; and
(8) with any of the summand digits equal to the resulting summation digit, the carrying-out is effected only for the addend digit 4 whereas the carry-out is not effected for the addend digits other than 4.

It will readily be understood that the two rules described just above involve the rules 1–3 described previously in conjunction with the energized resistor 14 or the summation digit 0.

By tracing the wiring diagram of the selecting network portion II shown in FIG. 1, it will readily be seen that the resistor 14 and the summation windings 1Za—4Za may disjunctively be connected to one or the other of the internal carry leads 13 and 13′ through the selecting network portion II in acocrdance with the two last-mentioned rules.

For example, the summation digit 2 will be obtained in the cases illustrated in the following table:

*Table 3*

| Case | Summand | Addend | Carry-in Digit |
|---|---|---|---|
| 1 | 0 | 2 | No. |
| 2 | 1 | 1 | No. |
| 3 | 2 | 0 | No. |
| 4 | 3 | 4 | No. |
| 5 | 4 | 3 | No. |
| 6 | 0 | 1 | Yes. |
| 7 | 1 | 0 | Yes. |
| 8 | 2 | 4 | Yes. |
| 9 | 3 | 3 | Yes. |
| 10 | 4 | 2 | Yes. |

From Table 3 it wil be seen that, with the resulting summation digit 2, (7′) The carrying-out is effected for the summand digit 3 or 4; and
(8′) if the summand digit is 0, 1 or 2, the carrying-out is effected only for the addend digit 4 whereas the carrying-out is not effected for the addend digits other than 4.

Therefore, the selecting network portion II with the energized summation winding 2Za is required to be subjected to the following orders:

(IV) the current flow through the summation winding 2Za shall be passed to the internal carry lead 13′ when the summand contacts 3x or 4x will have been operated; and
(V) If the summand contacts 0x, 1x or 2x are operated, the current flow through the summation winding 2Za shall be passed to the internal carry lead 13′ only when the addend contacts 4y will have been operated, whereas that current flow shall be passed to the internal carry lead 13 when the addend contacts 4y will not have been operated.

The order IV may be modified as follows:

(IV′) the current flow through the summation winding 2Za shall be passed to the internal carry lead 13′ when the summand contacts 0x, 1x or 2x will not have been operated.

From the wiring diagram of the network portion II shown in FIG. 1, it will readily be seen that, with the summand contact 0x6, 1x6 or 2x6 not operated, the summation winding 2Za is connected through the brake half of the summand transfer contact 0x6 to the internal carry lead 13′. With the summand contact 0x6, 1x6 or 2x6 operated, the winding 2Za may be connected to the lead 13′ through the addend transfer contact 4y3 as operated while it may be connected to the internal carry lead 13 through the contact 4y3 as unoperated. Thus the selecting network portion II with summation winding 2Za energized can be operated in accordance with the orders IV and V and hence with the rules 7′ and 8′. Similarly it will be seen that, if any one of the summation windings 1Za, 3Za and 4Za is to be energized, the network portion II can be operated in accordance with the rules 7 and 8.

Therefore, it will be apparent that the internal carry lead 13 can disjunctively be connected to the resistor member 14 and the winding members 1Za—4Za through the break half of the addend transfer contact 4y3 and the make half of one of the summand transfer contacts 0x6—4x6, whereas the internal carry lead 13′ can disjunctively be connected to those members 14, 1Za—4Za through the make half of the contact 4y3 and the make half of one of the contacts 0x6—4x6.

As described above, the quinary section of the Z-operating network 10 according to the invention comprises not only the contact network capable of adding two digits together and simultaneously to the carry-in digit but also the separate contact network capable of simultaneously determining whether or not the carry-out digit will be carried forward to be added with the digit in the next network section without the necessity of using any carry-in relay and/or any carry-out relay. Therefore, the output digits or the summation and carry-out digits can be determined extremely rapidly.

As pointed out previously, the binary section of the α-operating network 10 is operable when the digit or digits to be handled is or are 5 or more, that is to say, when the summand digit and/or the addend digit to be handled is or are the decimal digit 5 or more. Also, it will be brought into operation when the summation digit appearing in the preceding quinary section will have been the decimal digit 5 or more.

Since the binary section handles only the binary numbers 1 and 0, it is sufficient to consider the cases shown in the following tables.

*Table 4*

[With the carry-in digit absent or with the energization effected through the internal carry lead 13]

| Case | Summand Digit (Binary) | Addend Digit (Binary) | Summation Digit (Binary) | Carrying-out |
|---|---|---|---|---|
| 1 | 0 | 0 | 0 | No. |
| 2 | 0 | 1 | 1 | No. |
| 3 | 1 | 0 | 1 | No. |
| 4 | 1 | 1 | 0 | Yes. |

*Table 5*

[With the carry-in digit present or with the energization effected through the internal carry lead 13′]

| Case | Summand Digit (Binary) | Addend Digit (Binary) | Summation Digit (Binary) | Carrying-out |
|---|---|---|---|---|
| 5 | 0 | 0 | 1 | No. |
| 6 | 0 | 1 | 0 | Yes. |
| 7 | 1 | 0 | 0 | Yes. |
| 8 | 1 | 1 | 1 | Yes. |

The summand digit 0 means that the summand contacts 5*x* are not operated. The transfer contacts 5*y* for the addend will be operated when the addend digit will be the decimal digit 5 or more, or when the binary unity will appear whereas they will not be operated when the addend will be the decimal digit 4 or less. Also, the summation winding 5*Za* will be energized as the summation digit will be the binary unity whereas the winding will not be energized as the summation digit will be the binary zero.

From the above description and by tracing the wiring diagram enclosed with dotted rectangle III, it will be seen that the binary section III is operable to bring the summation winding 5*Za* into the state to be energized when the resulting summation digit will be the binary unity and to connect either of the carry-out leads 12 and 12′ with one or the other to the internal carry leads 13 and 13′ in accordance with the rules 7 and 8′ described previously.

With the summand digit 0 and the addend digit 1, for example, the winding 5*Za* is ready to be energized by means of internal carry lead 13, through the make half of the transfer contact 5*y*1 and the brake half of the summand contact 5*x*2 and is connected to the carry-out lead 12 through the break half of the summand contact 5*x*4. This corresponds to case 2 shown in Table 4. If the summand digit 1 will be added to the addend digit 0 with the carry-in digit present, the resistor 16 will be ready to be energized by means of the internal carry lead 13′ through the brake half of the transfer contact 5*y*2 and the make half of the summand contact 5*x*2.

As an example, consider that a summand 739 is added to an addend 365. After the completion of one sequence of operation described in conjunction with FIG. 5, the units position includes the operated or closed summand contacts 4*x* in the quinary section and the operated summand contacts 5*x* in the binary section; the tens position includes the operated summand contacts 3*x* in the quinary section; the hundreds position includes the operated summand contacts 2*x* in the quinary section and the operated summand contacts 5*x* in the binary section; and the thousands position includes only the operated summand contact 0*x*. When the addend 365 has been then registered, the units position includes the operated transfer contacts 5*y* in the binary section; the tens position includes the operated transfer contacts 1*y* in the quinary section and the operated transfer contacts 5*y* in the binary section; the hundreds position includes the operated transfer contacts 3*y* in the quinary section; and the thousands section includes no transfer contact operated.

In this condition, the switch 53 (FIG. 5) may be closed. Then a current will flow from the source of direct current 51 (FIG. 5) through the carry-in lead 11 connected to the netwok 10 in the units position, the brake halves of transfer contacts 1*y*1—4*y*1, the conductor $e_0$, the closed summand contact 4*x*5, the summation winding 4*Za*, the make half of the operated summand contact 4*x*6, the brake half of the transfer contact 4*y*3 to the internal carry lead 13 and thence through the make half of the operated transfer contact 5*y*1, the make half of the operated summand contact 5*x*2, the resistor 16, the carry-out lead 12′ to the carry-in lead 11′ connected to the network 10 in the tens position. The current will flow from said lead 11′ through the make half of the operated transfer contact 1*y*2, the conductor $e_2$, the closed summand contact 3*x*2, the resistor 14, the brake half of the summand contact 0*x*6 to the internal carry lead 13′ and thence through the make half of the operated transfer contact 5*y*2, the brake half of the summand contact 5*x*3, the resistor 16, the carry-out lead 12′ to the carry-in lead 11′ connected to the network 10 in the hundreds position. The current then will flow from that lead 11′ through the make half of the operated transfer contact 3*y*2, the conductor $e_4$, the closed summand contact 2*x*4, the summation winding 1*Za*, the brake half of the summand contact 1*x*6, the brake half of the summand contact 0*x*6, to the internal carry lead 13′ and thence through the brake half of the transfer contact 5*y*2, the make half of the operated summand contact 5*x*2, the resistor 16, the carry-out lead 12′ to the carry-in lead 11′ connected to the network 10 in the thousands position. Further the current will be passed from said lead 11′ through the brake halves of the transfer contacts 1*y*2—4*y*2, the conductor $e_4$, the closed summand contact 0*x*1, the summation winding 1*Za*, the brake half of the summand contact 1*x*6, the make half of the operated summand contact 0*x*6, the brake half of the transfer contact 4*y*3 to the internal carry lead 13 and thence through the brake half of the transfer contact 5*y*1, the brake half of the transfer contact 5*y*1, the brake half of the summand contact 5*x*1, the resistor 15, the carry-out lead 12 to the carry-in lead 11 connected to the network 10 in the ten thousands position. Then the current will be passed from said lead 11 through the brake halves of the transfer contacts 1*y*1—4*y*1, the conductor $e_0$, the closed summand contact 0*x*5, the resistor 14, the make half of the operated summand contact 0*x*6, the brake half of the transfer contact 4*y*3 to the internal carry lead 13 and thence through the brake half of the transfer contact 5*y*1, the brake half of the summand contact 5*x*1, the resistor 15, the carry-out lead 12 to the carry-in lead 11 connected to the network 10 in the hundred thousands position. Finally the current will flow from said lead 11 through the networks 10 in the higher digital positions and the closed switch 53 back to the source of direct current 51.

Therefore, the summation winding 4Za will be energized in the units position while no summation winding energized in the tens position. In the thousands and ten thousands positions the summation windings 1Za will be energized and in the higher digital positions no summation winding will be energized. After the switch 52 will have been operated as described in conjunction with FIG. 5, the resulting numeral 1104 will be obtained.

While one embodiment of the invention has been described and shown in the drawings, it will readily be understood by those skilled in the art that various changes and modifications may be made without departing from the spirit and scope of the invention. For example, the transfer contacts 1y—5y for addends have been explained as being controlled by the registering keys. However, these contacts may be controlled by resistor relays corresponding to the quinary numbers 0–4 and the binary number 1 respectively. Also the invention is applicable to a network employing a number system of notation having any integer as a radix or base. The binary section of the Z operating network 10 may be constructed in the similar form to that of the quinary section thereof in which, instead of using one resistor and four summation windings, a resistor and a summation winding corresponding respectively to the binary 0 and 1 will be used. In order to add two binary numbers together a plurality of the binary sections of the Z operating networks may be connected in series with each other through pairs of the carry leads 12, 13 and 12′, 13′.

What I claim is:

A relay type bi-quinary adder apparatus for adding digits of decimal numbers, said digits having the same digital position and said adder apparatus comprising: a pair of inputs one of which is activated when a carry-in digit 0 is present from the addition of a preceding digital position, and the other of which is activated when a carry-out digit 1 is present; a quinary network section for designating the digits, 0, 1, 2, 3, and 4 and comprising; a first network portion including five summation members energizable responsive to the summation digits 0–4 respectively, the summation responsive members corresponding to the digit 0 being a resistor and the remaining said members being relay winding members; a first contact network connected to said pair of inputs and comprising a pair of addend transfer contact chains and five groups of summand contacts, each said summand group including five normally open and operable to close summand relay contacts responsive to the summand digits 0–4 respectively and associated with said five summation members for each said member to be connected to all the groups by a different summand contact from each group, and each said addend chain including four addend transfer contacts operable from make to break positions responsive to the addend digits 0–4 respectively, the transfer contacts for the addend digits 1, 2, 3 and 4 in one said transfer chain connected to one input of said pair of inputs being respectively coupled to the transfer contacts for the addend digits 2, 3, 4 and 1 in the other said transfer chain connected to the other input of said pair of inputs and to different groups of the summand contact groups for disjunctively connecting one of said inputs to the summation responsive members through the summand and addend contacts in said first contact network, dependent on the resulting quinary summation digit obtained from the addition of the summand and addend digits and said carry-in digit; and a second network portion comprising two internal carry leads, a summand transfer chain including four summand transfer contacts operable from break to make positions responsive to the summand digits 0–3 respectively and adapted to be coupled to the summation responsive members for the digits 0–3 and to one of said internal carry leads, a summand transfer contact operable from a break to a make position responsive to the summation digit 4 and adapted to be coupled to the summation responsive member for the digit 4 and to the other said internal carry lead, and an addend transfer contact operable from a break to a make position responsive to the addend digit 4 coupled to said pair of internal carry leads, said second network portion for disjunctively connecting said pair of internal carry leads to that summation responsive member corresponding to said resulting summation digit through the addend and summand contacts in accordance with the presence of a carry-out digit; and a binary network section connected in series with said quinary network section for designating digits 5, 6, 7, 8 and 9 and comprising a third network section consisting of a pair of transfer trees having a pair of inputs connecting said pair of internal carry leads respectively and three outputs connected respectively and three outputs connected respectively to a pair of summation resistor members responsive to the decimal summation digits below 5 and a summation relay winding member responsive to the decimal summand digit 5, each of said transfer trees including a pair of summand transfer contacts operable from break to make positions responsive to the decimal summand digit 5 and an addend transfer contact operable from a break to a make position responsive to the decimal digit 5, one said summand transfer contact, being common in said pair of the transfer trees, the pair of said summation resistor members being connected to said pair of outputs respectively, said second contact network being operable to disjunctively connect one of the internal carry leads to said summation responsive members through the addend and summand operated and unoperated contacts in said second contact network, dependent on the resulting binary summation digit obtained from the addition of the binary summand and addend digits and the carry-in digits 1 and 0 and simultaneously to select one of said summation resistor members in accordance with the presence of the carry-out digit 1 in the binary section, said summation relay winding being arranged to be connected to one of said outputs through a summand relay transfer contact having make and break positions and operated from said break to make positions, addend transfer contact having break and make positions and operated from break to make positions, and to be connected to the other output through said summand relay transfer contact in break positions and alternatively through said summand relay transfer contact in make position and said addend transfer contact in break position, said last mentioned transfer contacts being responsive to the decimal digits below 5 whereby two decimal digits are added together and to the carry-in digit and simultaneously the carry-out digit is provided for addition in the next digital position.

References Cited in the file of this patent

UNITED STATES PATENTS

| | | |
|---|---|---|
| 2,679,977 | Andrews | June 1, 1954 |

FOREIGN PATENTS

| | | |
|---|---|---|
| 780,955 | Great Britain | Aug. 14, 1957 |